Sept. 15, 1970    SHOICHI MURAKAMI ET AL    3,528,128
SPINNERET FOR MANUFACTURE OF ODD-SHAPED HOLLOW FILAMENTS
Filed Aug. 28, 1967    3 Sheets-Sheet 1

SHOICHI MURAKAMI &
HARUHIKO TODA,
INVENTORS

BY Wendworth Lind
And Ponack, Attorneys

Sept. 15, 1970   SHOICHI MURAKAMI ET AL   3,528,128
SPINNERET FOR MANUFACTURE OF ODD-SHAPED HOLLOW FILAMENTS
Filed Aug. 28, 1967   3 Sheets-Sheet 2

SHOICHI MURAKAMI &
HARUHIKO TODA,
INVENTORS

United States Patent Office 3,528,128
Patented Sept. 15, 1970

3,528,128
SPINNERET FOR MANUFACTURE OF ODD-SHAPED HOLLOW FILAMENTS
Shoichi Murakami and Haruhiko Toda, Mihara-shi, Japan, assignors to Teijin Limited, Osaka, Japan
Filed Aug. 28, 1967, Ser. No. 663,866
Claims priority, application Japan, Sept. 1, 1966, 41/57,731
Int. Cl. D01d 3/00
U.S. Cl. 18—8      4 Claims

ABSTRACT OF THE DISCLOSURE

Spinneret suitable for the manufacture of hollow filaments of odd-shaped cross section which utilizes the character of the flow of a polymer melt from a specific orifice to bend spontaneously after extrusion. The orifice consists of at least two V-shaped elemental extrusion orifices each of which is made by causing one end of two rectangular slots to meet with each other.

The shape and arrangement of the elemental orifice should satisfy the three mathematical expressions given in the specification.

---

This invention relates to a spinneret for the manufacture of hollow filaments of odd-shaped cross section in the melt-spinning of a linear synthetic high polymeric material.

The conventional methods of producing hollow filaments from a melt of a linear synthetic polymer can be roughly classified into two classes. The first of these classes consists of a method of using a spinneret device having a complicated structure as disclosed, for instance, in U.S. Pat. 3,075,241, U.S. Pat. 3,081,490 and British Pat. 948,073. In this method, the spinneret device is difficult to produce because of its complicated structure, and very costly as compared with an ordinary spinneret device. Further, extrusion orifices tend to be clogged by foreign matter during the extrusion operation, which results in the discontinuance of extrusion. There is a further defect, which is that it is very difficult to cleanse the spinneret after use.

The second class of methods of manufacturing hollow filaments by melt-spinning is a method in which is used a spinneret having orifices of a special shape, as is shown in British Pat. 853,062 and British Pat. 843,179, for instance. This method also has encountered various difficulties. The shaping of the spinning orifices is difficult because the shape of the orifice consists of a complicated curve. This, therefore, involves a high cost of production for a spinneret. Further, the shapes of the produced filaments are irregular and uneven. Some of them may be in the shape of a closed hollow section, but others are often of a broken shape which cannot be regarded as being hollow. As disclosed in the prior art, in the arrangement of the orifices where one end of an orifice lies opposite to the longitudinal side of an adjoining orifice, the hollow ratio is disadvantageously lowered, and the spinneret is structurally weakened. Thus, the shape of the orifice tends to be deformed during use.

With a view to overcoming the difficulties of the prior art, we have carefully studied a known method of producing hollow yarns by coalescing and also the behaviour of the flow of a linear high polymeric material through a slot. This extensive research has finally led us to the present invention.

An object of this invention is to provide an improved spinneret of a simple structure which is capable of stably producing hollow filaments of odd-shaped cross-section having a high hollow ratio.

Another object of this invention is to provide synthetic filaments having excellent bulkiness, warmth retentivity and which have a tactile hand by using this improved spinneret.

In explaining the spinneret of this invention, the principle lying under the basis of the present invention will be described.

Generally, when a linear high polymeric material having flowability is extruded from an orifice whose shape is not symmetrical with respect to a point, the polymeric material is extruded from the orifice in a bent streamline because of differences in the linear speed of extrusion at various positions within the orifice. The polymeric material is bent in a direction toward the location where the linear speed is lower. We have studied the behaviour of this bent flow, and discovered the following experimental facts.

When a synthetic high polymeric material having flowability is extruded from a V-shaped orifice having a sharp tip and constructed by associating only the one end of two rectangular slots, the degree of bending of the flow of the high polymeric material after extrusion has such a relation to $\theta$, which is the angle formed by the two rectangular slots at the point of association (this angle will be hereafter called "an angle of aperture of slots"), that the larger $\theta$ is, the smaller is the degree of bending of the streamline as long as $\theta$ is in a range where $\theta$ is not extremely small. If $\theta$ is extremely small, the direction of bending of flow will be reversed.

As a result of our study, we have found that the bending of flow is directed in the direction of an angle of aperture of a V-shaped orifice when the following expression 1 is satisfied:

$$1 > \sin \frac{\theta}{2} > \sqrt{\frac{d^2}{l^2 d^2}} \quad (1)$$

where $\theta$ is an angle of aperture of the slots; $l$ is a length of the slot; and $d$ is a width of the slot (shown in FIG. 1).

A V-shaped extrusion orifice having a sharp tip constructed by causing only the one ends of two rectangular slots to meet with each other, which satisfies the above expression (1) is termed an "elemental extrusion orifice."

Based on the above-mentioned experimental results, we have constructed one extrusion orifice by combining at least two elemental extrusion orifices, making such an arrangement that each of the sharp tips of the elemental extrusion orifices is directed outwardly. We have found that excellent hollow filaments having an odd-shaped cross section can be produced by extruding a melt of a linear high polymeric material from a spinneret having at least one of such orifice which further satisfies the following expression (2) with respect to the arrangement and shape of the elemental extrusion orifice $$\begin{Bmatrix} l \geq 3d \geq 0.3 \text{ mm.} \\ 1 \text{ mm.} > a \geq 0.1 \text{ mm.} \end{Bmatrix}$$

where $a$ is the shortest distance between the ends of two adjoining elemental orifices (as shown in FIG. 2).

The elemental extrusion orifice to be provided in the spinneret of the present invention will be described in more detail with reference to the accompanying drawings in which.

Figure 1:
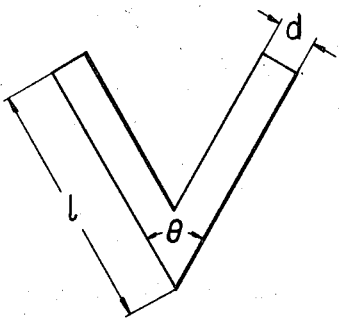
FIG. 1 is a view showing the elemental extrusion orifice of this invention.

In FIG. 1 the parameters regarding the shape of the elemental extrusion orifice of this invention are shown in an enlarged view. The essential element of this invention is that these parameters of the shape should satisfy the afore-mentioned expressions 1 and 2. To fulfill the expression, $\theta$ should be below 180°, but a more preferable value of $\theta$ is in the range of 30° to 90°.

The preferred value of the ratio of $l/d$ is in the range of 5 to 15. Likewise, a preferred value of $d$ necessary to obtain good results is in the range of 0.1 mm. to 2.0 mm.

Figure 2A:
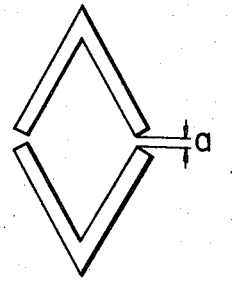
FIG. 2A is a view showing one extrusion orifice according to this invention which consists of two elemental extrusion orifices.
Figure 2B:
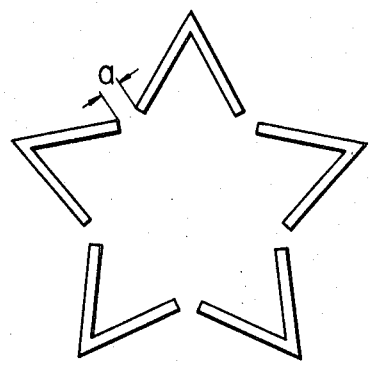
FIG. 2B is a view showing another extrusion orifice according to this invention which has five elemental extrusion orifices.

In FIGS. 2A and 2B, embodiments of combinations of the elemental extrusion orifices of this invention are shown. The extrusion orifice of a spinneret of this invention consists of at least 2 elementals extrusion orifices, but the number of elemental extrusion orifices is preferably 2 to 5. Parameter $a$ regarding the arrangement as shown in the drawing should satisfy the conditions of expression 2.

To obtain good results, it is very preferable that elemental extrusion orifices should be arranged in a manner such that all bisectors of the angles between slots of the elemental extrusion orifices will meet substantially at a point.

Figure 3A:
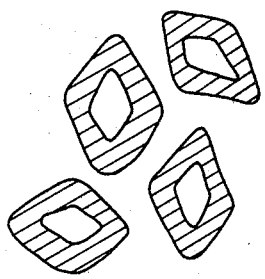
FIG. 3A and FIG. 3B are sketches of the cross sections of hollow filaments of odd-shaped sections produced by the use of the extrusion orifices of FIG. 2A and FIG. 2B respectively.
Figure 3B:
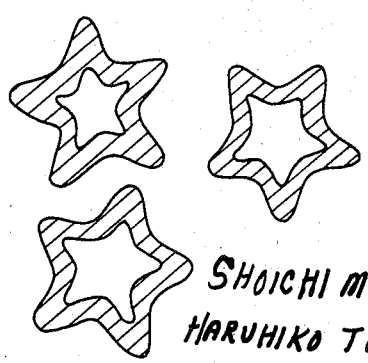
Figure 4A:
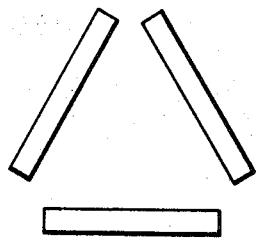
FIGS. 4A, 4B and 4C are views respectively showing extrusion orifices consisting of a prior art combination of elemental extrusion orifices.
Figure 4B:
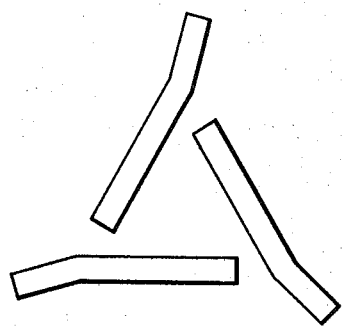
Figure 4C:
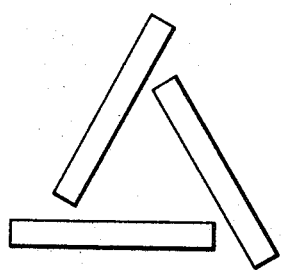
Figure 5A:
FIGS. 5A, 5B and 5C are sketches of the cross sections of filaments produced by the use of the extrusion orifices of FIGS. 4A, 4B and 4C respectively.
Figure 5B:
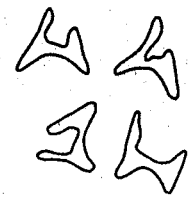
Figure 5C:
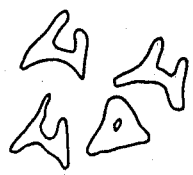

A hollow filament having the section shown in FIG. 3A is obtained by the extrusion orifice of FIG. 2A, and a hollow filament having the section of FIG. 3B comes from the extrusion orifice of FIG. 2B. FIGS. 5A–5C show the sectional views of the filaments obtained correspondingly from the extrusion orifices shown in FIGS. 4A–4C. According to the conventional methods, filaments of broken section which cannot be regarded as being hollow are produced in many cases, and if hollow filaments are obtained, they have a small hollow ratio. However when the spinneret of this invention is used, we can obtain filaments having a predetermined shape and a hollow ratio higher than in the case of the conventional spinneret.

The material to be used for the spinneret of this invention is the same as used for an ordinary spinneret, such as DIN 17224-440 stainless steel.

Linear synthetic high polymers such as polyesters, polyamides, polypropylene and polyurethane can be spun by means of the spinneret of this invention.

In the spinneret of this invention, an elemental extrusion orifice is constructed substantially by straight line slots. Thus, it is very easy to shape the orifice, and the cost of production of the orifice is low. By combining elemental extrusion orifices in various manners, it is possible to produce hollow filaments of many kinds of odd-shaped cross sections.

Another advantage of the present invention is that because the present invention has dexterously utilized the tendency of a polymer melt flow extruded from each elemental extrusion orifice to bend spontaneously towards the center of the extrusion orifice, a complete mutual coalescing is accomplished, and it is possible to produce hollow filaments having a predetermined odd shape.

The spinnerset of this invention can be operated in quite the same manner a spinneret in an ordinary spinning operation, and can be very easily cleansed and repaired. It is possible, too, to provide on a spinnerset plate the same number of the extrusion orifices of this invention as that of an ordinary circular nozzle, because of the simplicity of the shape.

The invention will further be described with reference to examples. The term "hollow ratio" used throughout the specification is defined by the following equation:

$$\text{Hollow ratio} = \frac{\text{Cross sectional area of hollow part}}{\text{Entire cross sectional area}}$$

EXAMPLE 1

Poly-ε-caprolactam having an intrinsic viscosity of 1.30 was melted at 255° C., and extruded at a rate of 40 g./min. by using a spinneret having ten orifices each of which consists of three elemental extrusion orifices having a dimension of $a=0.2$ mm., $d=0.2$ mm., $l=1$ mm., and $\theta=60°$ arranged so that all of the sharp tips of said elemental orifices are directed outwardly and all bisectors of the angles between slots meet at one point. The extruded filaments were taken up at a rate of 500 m./min. and drawn to 3.8 times the original lengths. Hollow filaments of odd-shaped section having a hollow ratio of 20% were obtained.

EXAMPLE 2

Polyethylene terephthalate having an intrinsic viscosity of 0.92 was melted at 290° C., and extruded at a rate of 30 g./min. by using a spinneret having 24 orifices each of which consists of two elemental extrusion orifices having a dimension of $a=0.2$ mm., $d=0.2$ mm., $l=1$ mm., and $\theta=60°$ arranged so that all of the sharp tips of said elemental orifices are directed outwardly. The extruded filaments were taken up at a rate of 1000 m./min. and drawn to 3.7 times the original lengths. Hollow filaments of odd-shaped section having a hollow ratio of 18% were obtained.

EXAMPLE 3

Poly-ε-caprolactam having an intrinsic viscosity of 1.50 was melted at 270° C., and extruded at a rate of 40 g./min. by using a spinneret having ten orifices each of which consists of five elemental extrusion orifices having a dimension of $a=0.1$ mm., $d=0.2$ mm., $l=1.5$ mm., and $\theta=45°$ arranged so that all of the sharp tips of said elemental orifices are directed outwardly, and all bisectors of the angles between slots meet at one point. The extruded filaments were taken up at a rate of 650 m./min. and drawn to 3.5 times the original lengths. Hollow filaments of star-shaped section having a hollow ratio of 25% were obtained.

We claim:

1. A spinneret for the manufacture of odd-shaped and hollow filaments by melt-spinning of a linear synthetic high polymeric material, said spinneret having at least one extrusion orifice, said extrusion orifice consisting of an arrangement of a plurality of elemental extrusion orifices, each of the elemental extrusion orifices being V-shaped and formed of two rectangular slots meeting only at one end, the length $l$ of the slots, the width $d$, and the angle $\theta$ between the slots being according to the following expressions:

$$1 > \sin \frac{\theta}{2} > \sqrt{\frac{d^2}{l^2+d^2}}$$

$$l \geq 3d \geq 0.3 \text{ mm.}$$

all of the said elemental extrusion orifices having their sharp tips directed outwardly of the arrangement, and the shortest distance $a$ between the ends of the slots in two adjacent elemental extrusion orifices being according to the expression 1 mm′ $> a \geq$ 0.1 mm.

2. A spinneret as claimed in claim 1 in which the said extrusion orifices are positioned in the arrangement so that the bisectors of all the angles between the slots of the elemental orifices meet substantially at a point.

3. A spinneret as claimed in claim 1 in which the number of elemental extrusion orifices is from 2 to 5.

4. A spinneret as claimed in claim 1 in which the angle $\theta$ between the slots ranges from 30° to 90°.

References Cited

UNITED STATES PATENTS

| 3,095,258 | 6/1963 | Scott | 18—8 X |
| 3,187,607 | 6/1965 | Krummeck. | |

FOREIGN PATENTS

| 843,179 | 8/1960 | Great Britain. |
| 1,261,352 | 4/1961 | France. |
| 1,238,154 | 4/1967 | Germany. |

WILBUR L. McBAY, Primary Examiner